(No Model.)
H. F. ALLEN.
STEAM BOILER.
No. 314,308. Patented Mar. 24, 1885.
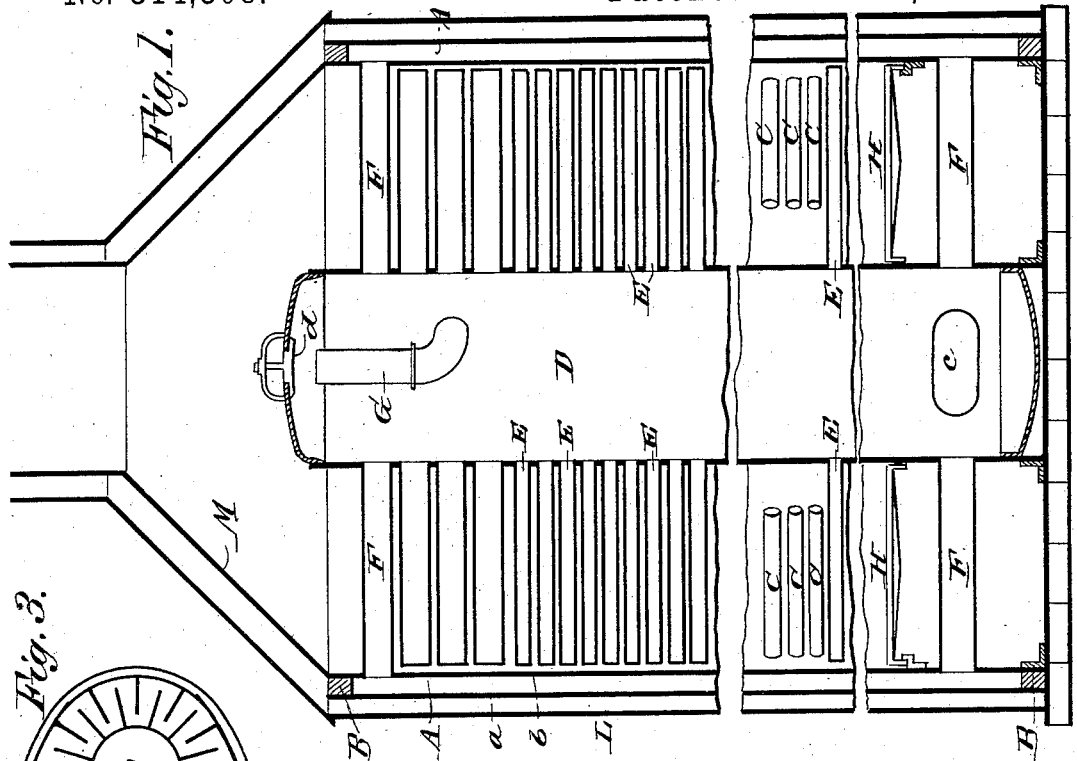
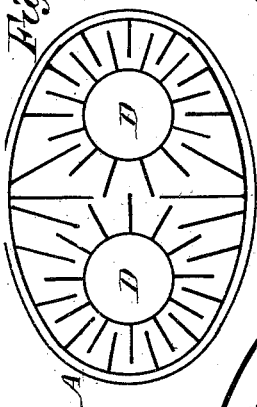
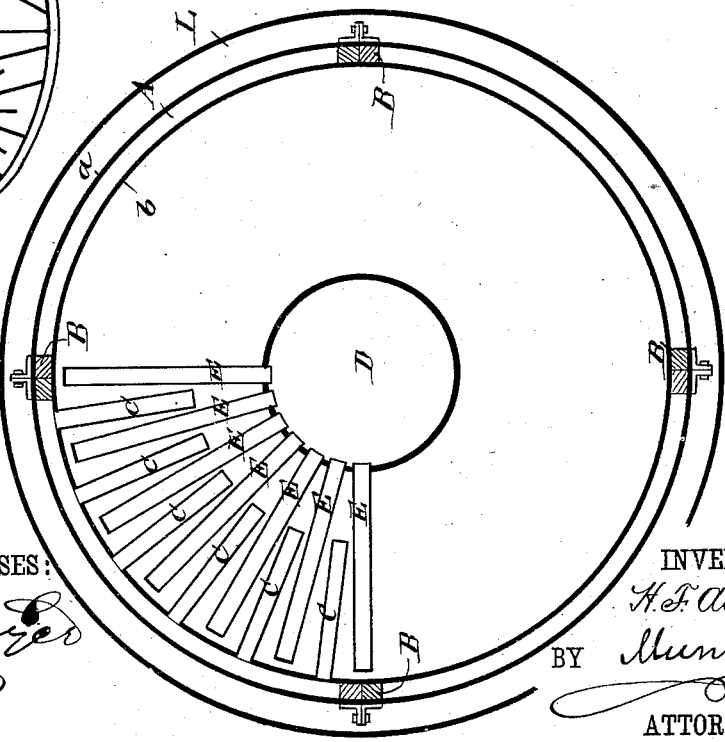
WITNESSES:
H W Beyer
C. Sedgwick
INVENTOR:
H. F. Allen
BY Munn & Co
ATTORNEYS.

UNITED STATES PATENT OFFICE.

HENRY F. ALLEN, OF NEW YORK, N. Y., ASSIGNOR TO EDWARD S. T. KENNEDY, OF SAME PLACE.

STEAM-BOILER.

SPECIFICATION forming part of Letters Patent No. 314,308, dated March 24, 1885.

Application filed September 25, 1884. (No model.)

*To all whom it may concern:*

Be it known that I, HENRY F. ALLEN, of the city, county, and State of New York, have invented a new and Improved Steam-Boiler, of which the following is a full, clear, and exact description.

The object of my invention is to provide a new and improved steam-boiler which is safe, strong, and reliable, and in which the water can be converted into steam in a very short time.

The invention consists in the construction and arrangement of parts, as will be hereinafter described and claimed.

Reference is to be had to the accompanying drawings, forming part of this specification, in which similar letters of reference indicate corresponding parts in all the figures.

Figure 1 is a vertical sectional view of my improved steam-boiler. Fig. 2 is a sectional plan view of the same. Fig. 3 is a sectional plan view of another arrangement of the parts.

The boiler is constructed with a hollow shell, A, the two walls $a$ $b$, forming the shell, being braced, stiffened, and held the desired distance apart by pieces B.

From the shell A a series of water-tubes, C, project inward radially, the said tubes being secured in the inner wall, $b$, and closed at their free ends.

In the interior of the boiler a cylindrical or other vessel, D, is located, which is closed securely on all sides and at the top and bottom. At the bottom it is provided with a man-hole, $c$, and at the top with an arm-hole, $d$. At the top and bottom the vessel D is connected by pipes F with the shell A.

From the vessel D water-tubes E, closed at the free ends, project outward radially, the said tubes E being arranged in between the tubes C.

If desired, the tubes E and C may be arranged to abut at the outer ends, or they may be arranged in alternate horizontal rows, the tubes extending entirely across the space between the shell and the vessel D.

The steam is drawn or taken from the boiler through a drying-pipe, G, which projects into the inner vessel, D, at the top.

The annular grate H is held at the bottom part of the boiler between the shell A and the vessel D.

In place of a circular shell, an oval, square, or oblong shell, A, may be provided, and two or more vessels, D, arranged in the same in place of one, the shell having inwardly and the vessels D outwardly projecting water-tubes—as, for example, as shown in Fig. 1. If desired, the inner vessel D may be dispensed with, and only the outer shell with the inwardly-projecting water-tubes used.

In all cases where the vessels D are used the water and steam are contained in the shell and in the vessels D and in the water-tubes of the shell and the vessel G.

In place of making the outer shell and the inner vessels D circular or oval, they may be made square or oblong.

The shell A is surrounded by a jacket, L, surmounted by a hollow hood, M.

The fire door or doors are arranged in the shell A in the usual manner.

Having thus described my invention, I claim as new and desire to secure by Letters Patent—

1. A steam-boiler constructed with a hollow shell, and with one or more vessels surrounded by the shell and connected with the same, and with water-tubes projecting inwardly from the shell, and water-tubes projecting outwardly from the interior vessels, substantially as herein shown and described.

2. A steam-boiler constructed with an exterior hollow shell, and one or more vessels surrounded by the shell and connected with the shell by pipes at the top and bottom, and with water-tubes projecting inwardly from the shell and outwardly from the inner vessels, the tubes of the shell projecting in between the tubes of the inner vessels, substantially as herein shown and described.

3. In a steam-boiler, the combination, with the hollow shell A, of one or more vessels, D, surrounded by the same, the water-pipes C E, the connecting-pipes F, and of the annular grate H, between the vessels D and the shell, substantially as herein shown and described.

HENRY F. ALLEN.

Witnesses:
 OSCAR F. GUNZ,
 C. SEDGWICK.